US006297835B1

(12) United States Patent
Li

(10) Patent No.: US 6,297,835 B1
(45) Date of Patent: Oct. 2, 2001

(54) METHOD AND APPARATUS FOR PROCESSING DATA AS DIFFERENT SIZES

(75) Inventor: Raymond M. Li, Markhan (CA)

(73) Assignee: ATI International SRL, Christ Church (KN)

( * ) Notice: Subject to any disclaimer, the term of this patent is extended or adjusted under 35 U.S.C. 154(b) by 0 days.

(21) Appl. No.: 09/166,038

(22) Filed: Oct. 5, 1998

(51) Int. Cl.[7] ................................ G09G 5/04; H04N 9/74

(52) U.S. Cl. ........................................... 345/600; 348/584

(58) Field of Search .................................... 345/115, 503, 345/526, 153, 154, 435; 348/584, 600, 598

(56) References Cited

U.S. PATENT DOCUMENTS 5,196,924 * 3/1993 Lumelsky et al. .................. 348/720
5,295,000 * 3/1994 Nonoshita et al. .................. 358/444
5,444,835 * 8/1995 Turkowski ........................... 345/435
5,448,307 * 9/1995 Gelissen et al. ..................... 345/584
5,469,190 * 11/1995 Masterson ............................ 345/202
5,821,918 * 10/1998 Reinert et al. ........................ 345/154
5,821,947 * 10/1998 Nguyen ................................ 345/473
5,883,613 * 3/1999 Iwaki ................................... 345/132

* cited by examiner

*Primary Examiner*—Jeffery Brier
*Assistant Examiner*—Ryan Yang
(74) *Attorney, Agent, or Firm*—Vedder, Price, Kaufman & Kammholz

(57) ABSTRACT

A method and apparatus for processing data of different sizes begins by processing first data to produce an n-bit resultant. Such processing may be performing an arithmetic function upon the data. In addition, second data is processed to produce an m-bit resultant. Such processing of the second data may also include performing an arithmetic function upon the second data. The processing then continues by mixing the n-bit resultant with the m-bit resultant to produce an m-bit mixed resultant. For example, the first data may be representative of RGB graphics data that is processed by a graphics core to produce an 8-bit resultant. The second data may be representative of video data that is processed by a video core to produce a 10-bit resultant. A mixer mixes the 8-bit graphics output with the 10-bit digital video output to produce a 10-bit mixed output. A digital-to-analog converter converts the 10-bit mixed output into an analog signal.

13 Claims, 4 Drawing Sheets

METHOD AND APPARATUS FOR PROCESSING DATA AS DIFFERENT SIZES

TECHNICAL FIELD OF THE INVENTION

This invention relates generally to data processing and more particularly to processing data of different sizes.

BACKGROUND OF THE INVENTION

A computer is known to comprise a central processing unit, system memory, peripheral ports, audio processing circuitry, and video processing circuitry. The peripheral ports enable the central processing unit to communicate with peripheral devices such as printers, monitors, the Internet, external tape drives, etc. The video graphics circuitry functions as a co-processor to the central processing unit for processing video data and/or graphics data. Typically, the video graphics circuitry includes a graphics core that processes the graphics data and a video core that processes the video data. As is also known, graphics data is generated by the central processing unit while executing computer applications and video data is received via a tuner from a television broadcast, cable broadcast, satellite broadcast, VCR, DVD player, etc.

The video graphics processor mixes the processed graphics data and the processed video data to produce a mixed resultant, which is provided to a digital to analog converter (DAC). The DAC converts the mixed resultant into an analog signal and provides the analog signal to a frame buffer for storage and subsequent display. As is known, the bit size of the processed graphics data, the processed video data, and the mixed resultant is at least partially based on a cost-performance tradeoff of the video core, graphics core, and the DAC. Currently, for commercial grade video graphics processors, the cost-performance tradeoff dictates an 8-bit data size for the processed graphics data, the processed video, and the miixed resultant. In particular, 8-bits was chosen because 8-bit DACs are relatively inexpensive and many graphics applications use 8-bit RGB data.

A performance tradeoff for using 8-bit data is a degradation of the reconstructed analog video signal. As is known, the tuner digitizes and quantizes the received analog video signal based on the bit size of the data. The quantization causes the degradation by digitally rounding off the representation of the analog signal. The rounding off causes some loss in the detail of the analog signal. The 8-bit data size keeps the loss of detail to a relatively low level, but the loss is noticeable to some viewers. As is also known, the amount of quantization decreases, hence the degradation decreases, as the number of bits of the data size is increased. Cost and compatibility with graphics data have kept the video core at an 8-bit data size.

The cost of higher data size DACs have recently dropped, thus making it a commercially viable option to use a 10 bit DAC in a video graphics processor. With a larger data size DAC, the amount of quantization would be reduced, thereby reducing degradation of video signals. While a 10-bit DAC would enable the development of a higher quality video core, the resulting 10-bit video data would be is incompatible with the 8-bit graphics data. As one can image, this incompatibility issue will continue well beyond the 10-bit and 8-bit incompatibility since the graphics art and digital-to-analog conversion art are separate and distinct arts. Thus, each art will advance at different paces.

Therefore, a need exists for a method and apparatus that allow incompatibility of graphics data and video data within a video graphics processor.

DETAILED DESCRIPTION OF A PREFERRED EMBODIMENT

Generally, the present invention provides a method and apparatus for processing data of different sizes. Such processing begins by processing first data to produce an n-bit resultant. Such processing may be performing an arithmetic function upon the data. In addition, second data is processed to produce an m-bit resultant. Such processing of the second data may also include performing an arithmetic function upon the second data. The processing then continues by mixing the n-bit resultant with the m-bit resultant to produce an m-bit mixed resultant. For example, the first data may be representative of RGB graphics data that is processed by a graphics core to produce an 8-bit resultant. The second data may be representative of video data that is processed by a video core to produce a 10-bit resultant. A mixer mixes the 8-bit graphics output with the 10-bit digital video output to produce a 10-bit mixed output. A digital-to-analog converter converts the 10-bit mixed output into an analog signal. With such a method and apparatus, data of different sizes may be processed with reduced quantization of the data. As such, within a video graphics environment, video data may be processed with reduced quantization losses by using a 10-bit data size as opposed to an 8-bit data size.

Figure 1:
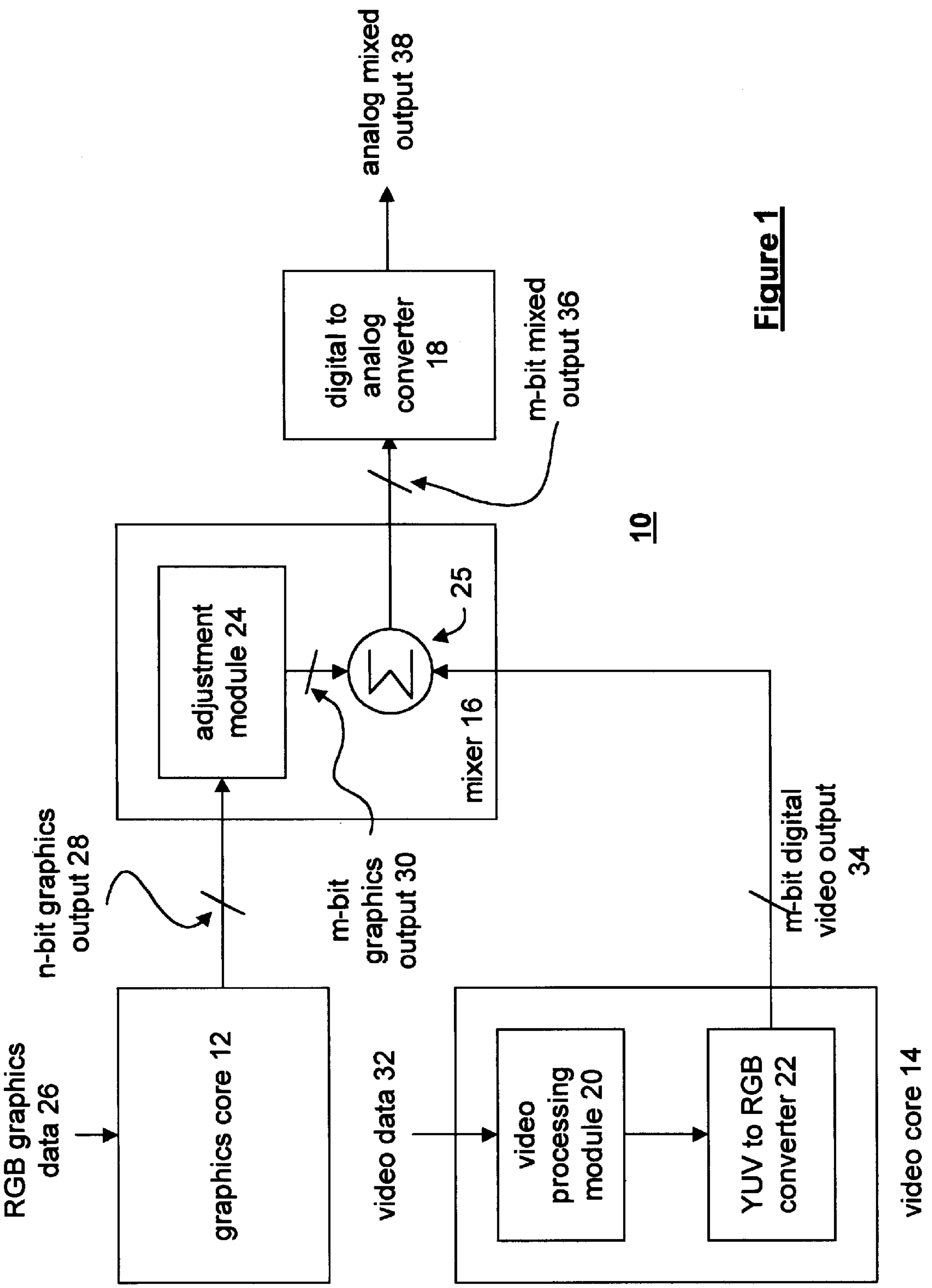
FIG. 1 illustrates a schematic block diagram of a video processing circuit in accordance with the present invention.

The present invention can be more fully described with reference to FIGS. 1 through 4. FIG. 1 illustrates a schematic block diagram of a video processing circuit 10 that includes a graphics core 12, a video core 14, a mixer 16, and a digital-to-analog converter 18. The graphics core 12 is operably coupled to receive RGB (red, green, blue) graphics data 26 and to produce therefrom an n-bit graphics output 28. The n-bits may be 8-bits, greater than 8-bits, or less than 8-bits. For example, a three-bit output may be used for flat panel displays, while 8-bits,16-bits, 24-bits and/or 32-bits may be used for CRT monitors. Note that the basic functionality of the graphics core functions similarly to a graphics core found in ATI Technologies, Inc. video graphics processors (e.g., RAGE 128, RAGE PRO) and/or video card (e.g., All-In-Wonder).

The video core 14 includes a video processing module 20 and a YUV to RGB converter 22. The video processing module 20 is operably coupled to receive video data 32 from a video source, such as a DVD player, CD player, VCR, television broadcast, cable broadcast and/or satellite broadcast. The video processing module 20 processes the video data by scaling, adjusting the brightness, contrast, or gamma factor of the video data and provides the processed video data to the YUV to RGB converter 22. The YUV to RGB converter 22 processes the received information to produce an m-bit digital video output 34. The m-bits may be 10-bits, greater than 10-bits, or less than 10-bits. In one application, the video processing module generates a 10-bit output that the YUV to RGB produces a digital video output 34, therefrom. Note that the basic functionality of the video core 14 functions similarly to a video core found in ATI Technologies, Inc. video card (e.g., All-In-Wonder). As one of average skill in the art would appreciate, the number of bits in the digital video output 34 may vary depending on the resolution desired, the reduction and quantization and/or the data capacities of the mixer 16 and the digital to analog converter 18.

The mixer 16 includes a mixing module 25, and an adjustment module 24. The adjustment module 24 is operably coupled to receive the n-bit graphics output 28 and to produce an m-bit graphics output 30. In essence, the adjusting module 24 converts the n-bit graphics output 28 into an m-bit graphics output 30. Such a conversion may be done by inserting zeros into the most significant bits of the m-bit graphics output 28, scaling the n-bit data to m-bit data, and/or any other technique for converting data from one data size to another. The mixing module 25 mixes the m-bit graphics output 30 with the m-bit digital video output 34 to produce an m-bit mixed output 36. The m-bit mixed output 36 is provided to the digital-to-analog converter 18 to produce an analog mixed output 38. As such, data of different sizes may be processed together. In particular, a video graphics processor may include a video core that processes data at a data size that is determined based on a cost/performance tradeoff of the video core path, without regard to the graphics core path. Thus, advancements in either art may be more readily incorporated into video graphics processors.

Figure 2:
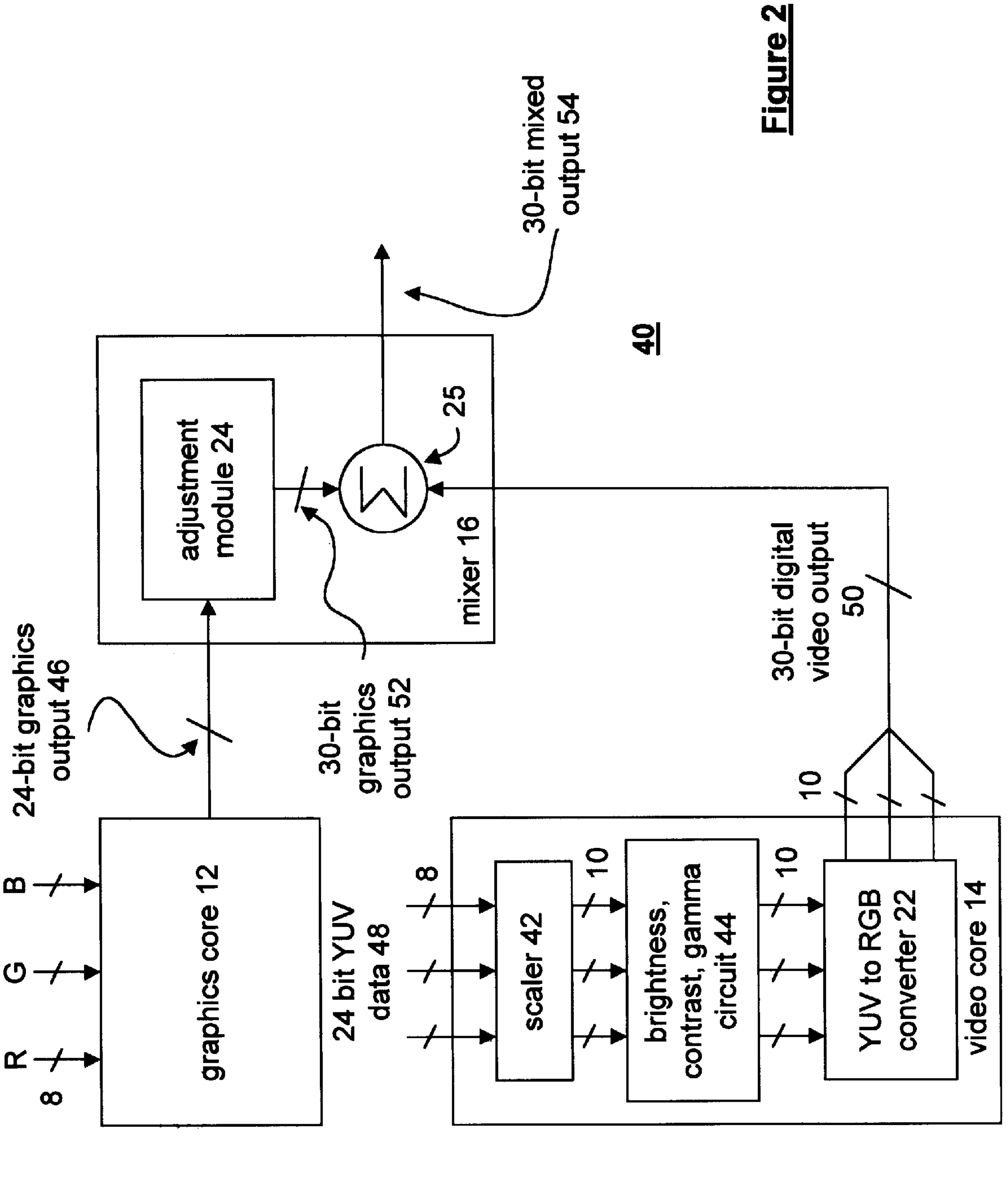
FIG. 2 illustrates an alternate schematic block diagram of a video processing circuit in accordance with the present invention.

FIG. 2 illustrates a schematic block diagram of an alternate video processing circuit 40. The video processing circuit 40 includes the graphics core 12, the video core 14, and the mixer 16. The graphics core 12 is operably coupled to receive 8-bits of red data, 8 bits of green data, and 8 bits of blue data to produce a 24-bit graphics output 46. The video core 14 includes a scaler 42, a brightness, contrast, gamma circuit 44, and the YUV to RGB converter 22. The scaler 42 is operably coupled to receive a 24-bit YUV data signal 48. The 24-bit YUV signal includes 8-bits of Y data, 8-bits of U data and 8 bits of V data. The scaler 42 scales the data 48 and outputs a 10-bit Y value, a 10-bit U value, and a 10-bit V value. The brightness, contrast, and gamma circuit 44 manipulates these functions of the data 48 to produce a 30-bit output. The 30-bit output is provided to the YUV to RGB converter 22 to produce the 30-bit digital video output 50. Note that the transition from 8-bits to 10-bits within the video core, may be done as shown after the scaler, done by the brightness, contrast and gamma circuit 44 or by the YUV to RGB converter 22.

The mixer 16 includes the mixing module 25 and the adjustment module 24. The adjustment module 24 is operably coupled to receive the 24-bit graphics output 46 and to produce therefrom a 30-bit graphics output 52. The mixing module 25 mixes the 30-bit graphics output 52 with the 30-bit digital video output 50 to produce a 30-bit mixed output 54.

Figure 3:
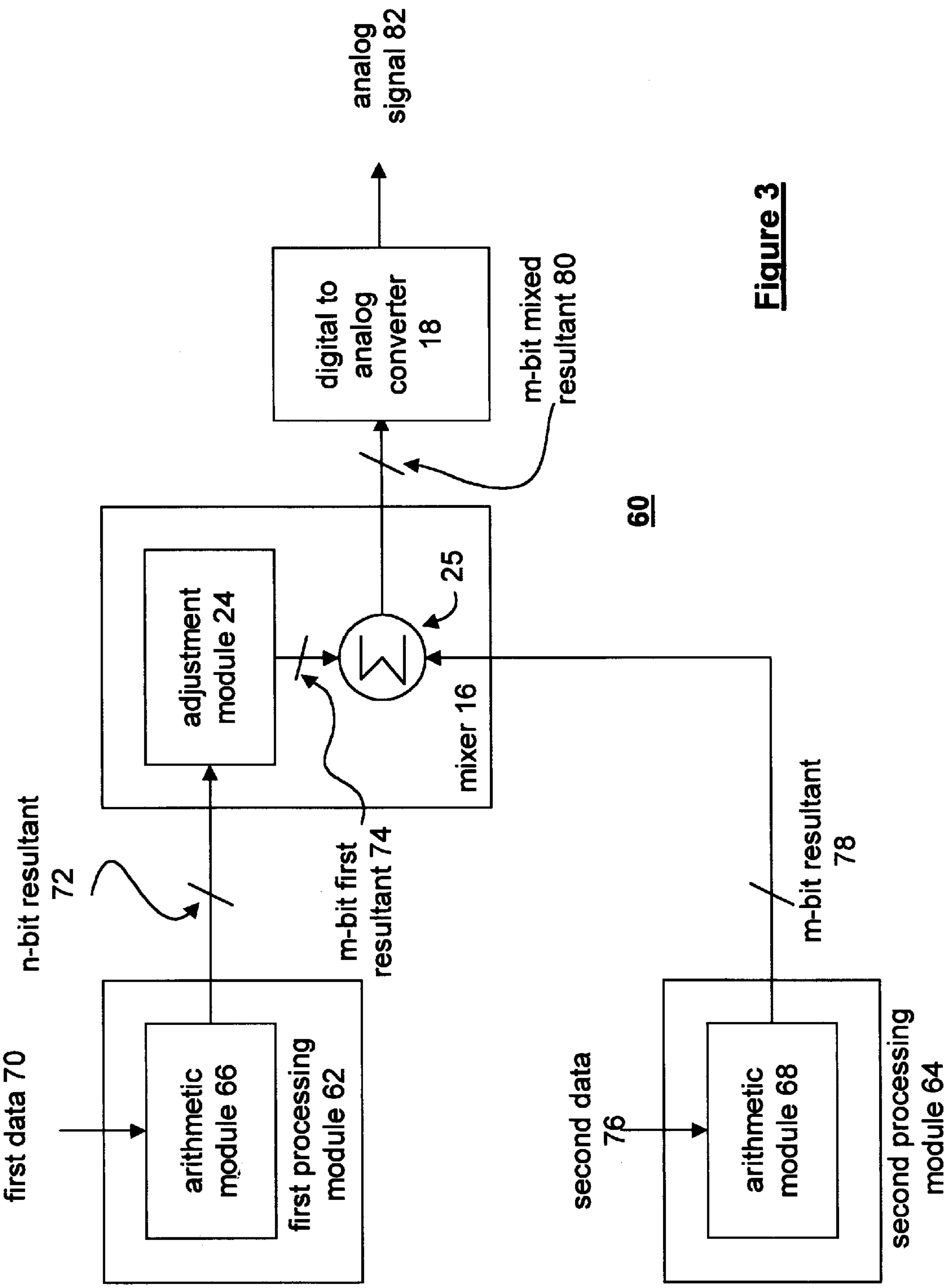
FIG. 3 illustrates a schematic block diagram of a processing circuit in accordance with the present invention.

FIG. 3 illustrates a schematic block diagram of a processing circuit 60 that includes a first processing module 62, a second processing module 64, the mixer 16 and the digital to analog converter 18. The first processing module 62 includes at least one arithmetic module 66 that is operably coupled to receive first data 70 and to produce therefrom an n-bit resultant 72. The arithmetic module 66 may perform an addition function, subtraction function, multiplication function, division function, and/or more complex mathematical functions such as integration, derivatives, differential equations, etc.

The second processing module 64 includes an arithmetic module 68 that is operably coupled to receive second data 76 and to produce therefrom an m-bit resultant 78. The arithmetic module 68 may be similar to the arithmetic module 66 in regards to the functions performed. As an example of the first and second processing modules 62 and 66, the first processing module may be a central processing unit of a computer while the second processing module may be a co-processor. In particular, the second processing module 64 may be a digital signal processor (DSP) that performs mathematical computations at a higher resolution than the CPU is capable of producing. When the resultants of the DSP are to be mixed with resultants of the CPU, the CPU resultants would be modified by the adjustment module 24.

Figure 4:
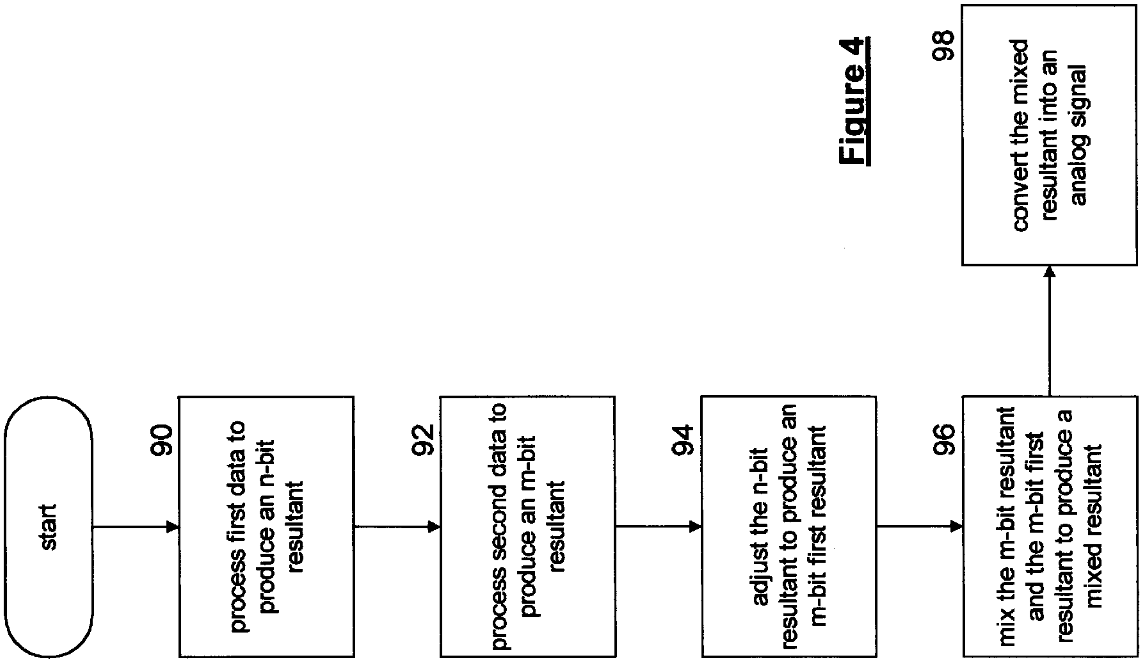
FIG. 4 illustrates a logic diagram of a method for processing data of different sizes in accordance with the present invention.

FIG. 4 illustrates a logic diagram of a method for processing data of different sizes. Such an algorithm may be performed by a central processing unit, co-processor, video graphics processing circuit, or any processing device that manipulates digital information based on operating instructions. The processing steps of FIG. 4 may be stored on a digital storage medium that is included within a personal computer or on a transportable digital storage medium such as a floppy disk, DVD, CD memory, memory chip, etc.

The process begins at step 90 where first data is processed to produce an n-bit resultant. Such processing may include performing an arithmetic function upon the first data. Such an arithmetic function may include converting RGB graphics data into a graphics output signal. The process then proceeds to step 92 where second data is processed to produce an m-bit resultant. Such processing again may be performed by an arithmetic logic unit and/or a video core. The process then proceeds to step 94 where the n-bit resultant is adjusted to produce an m-bit first resultant. The process then proceeds to step 96 where the n-bit resultant and the m-bit first resultant are mixed to produce a mixed resultant. The process then proceeds to step 98 where the mixed resultant is converted into an analog signal.

The preceding discussion has presented a method and apparatus for processing data of different sizes. Such is generally applicable to video graphic circuits where graphics data is processed at one data size while video data is processed at another data size. For example, the video graphics data may be processed as 24-bit data while the video data may be processed as 30-bit data The preceding discussion has presented several embodiments of the present invention, however, as one of average skill in the art would readily appreciate other embodiments may be readily derived from the teachings of the present invention without deviating from the scope or spirit of the present invention.

What is claimed is:

1. A video processing circuit comprises:

a graphics core that processes graphics data to produce a n-bit graphics output;

a video core that processes video data to produce an m-bit digital video output;

a mixer operably coupled to convert the n-bit graphics output into an m-bit graphics output and to mix the m-bit graphics output wit the m-bit digital video output to produce an m-bit bit mixed output where m is not equal to n; and a digital to analog converter operably coupled to convert the m-bit mixed output into an analog mixed output.

2. The video processing circuit of claim 1, wherein the video core comprises a video processing module and a YUV to RGB converter, wherein the video processing module performs at least one of the following functions on the video data: scaling, brightness control, contrast control, and gamma correction.

3. The video processing circuit of claim 1, wherein the mixer comprises an adjustment module operably coupled to adjust the n-bit graphics output to produce an m-bit graphics output prior to producing the m-bit mixed output.

4. A processing circuit comprises:

a fit processing module that processes first data to produce a n-bit resultant;

a second processing module that processes second data to produce an m-bit resultant; and a mixer operably coupled to the first and second processing modules, wherein the mixer converts the n-bit resultant into an m-bit first resultant mixes the m-bit first resultant and the m-bit bit resultant for the second data to produce an m-bit mixed resultant where m is not equal to n.

5. The processing circuit of claim 4 further comprises a digital to analog converter that converts the m-bit mixed resultant into an analog signal.

6. The processing circuit of claim 4, wherein the first processing module comprises an arithmetic module that performs at least one arithmetic function on the first data to produce the n-bit resultant.

7. The processing circuit of claim 4, wherein the second processing module comprises an arithmetic module that performs at least one arithmetic function on the second data to produce the m-bit resultant.

8. The processing circuit of claim 4, wherein the mixer comprises an adjustment module operably coupled to adjust the n-bit resultant to produce the m-bit first resultant prior to producing the m-bit mixed resultant.

9. A method for processing data of different sizes, the method comprises the steps of:

a) processing first data to produce a n-bit Tesultant;

b) processing second data to produce an m-bit resultant;

c) converting the n-bit resultant into an m-bit first resultant where m is not equal to n; and d) mixing the m-bit fist resultant and the m-bit resultant for the second data to produce an m-bit mixed resultant.

10. The method of claim 9 further comprises converting the m-bit mixed resultant into an analog signal.

11. The method of claim 9, wherein step (a) further comprises performing at least one arithmetic function on the first data to produce the n-bit resultant.

12. The method of claim 9, wherein step (b) further comprises performing at least one arithmetic function on the second data to produce the m-bit resultant.

13. The method of claim 9, wherein step c) further comprises adjusting the n-bit resultant to produce the m-bit first resultant prior to producing the m-bit mixed resultant.

* * * * *